March 1, 1966 D. M. KRAUSS 3,238,294
ELECTRO-OPTICAL SCANNING SYSTEM
Filed Sept. 20, 1961 3 Sheets-Sheet 1
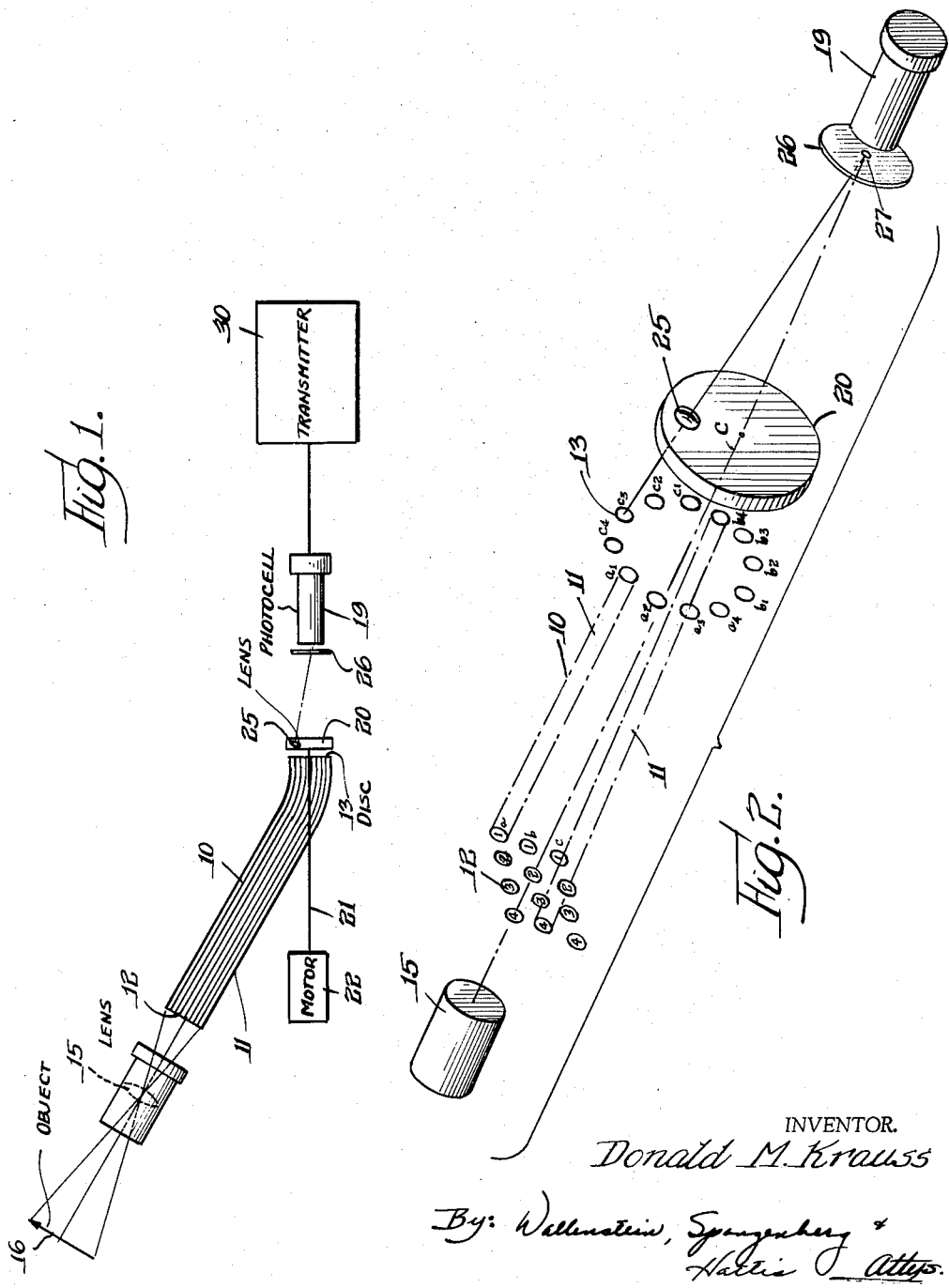
INVENTOR.
Donald M. Krauss INVENTOR.
Donald M. Krauss

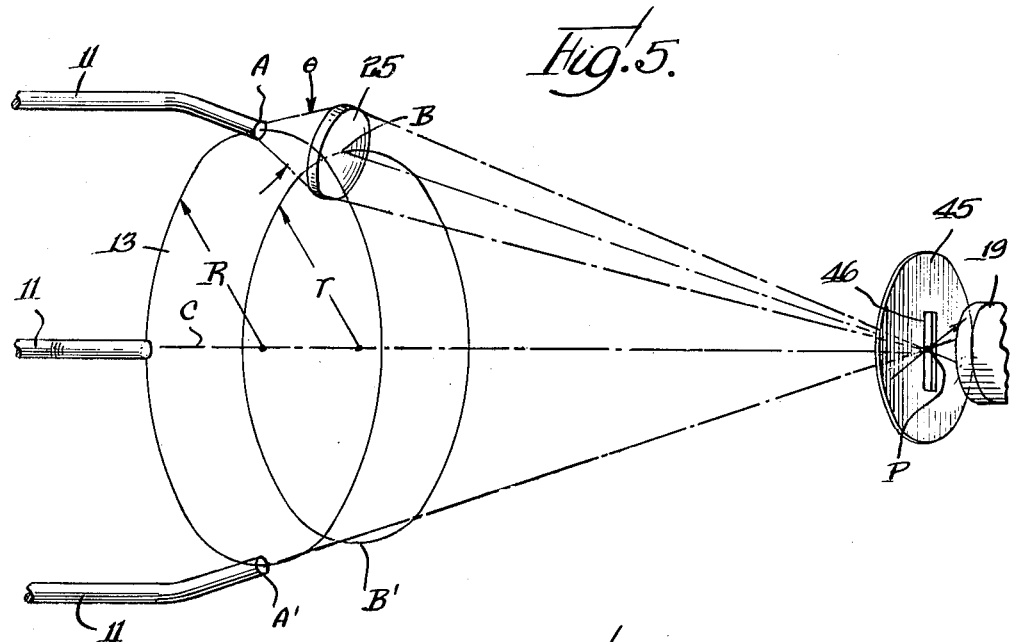
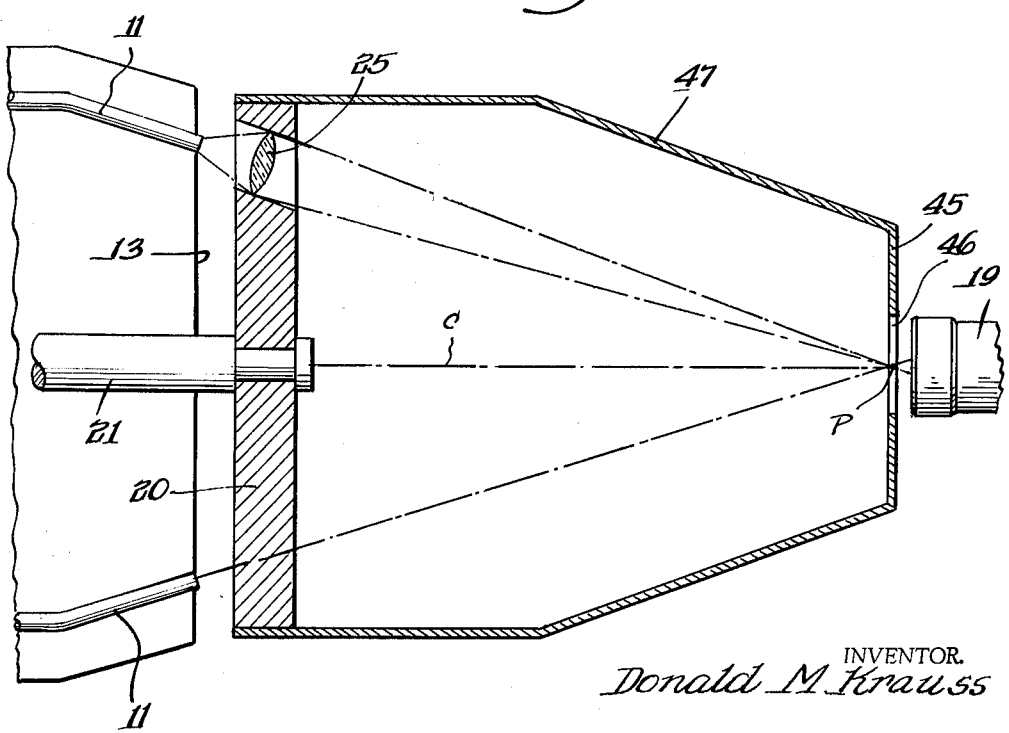
INVENTOR.
Donald M Krauss

United States Patent Office 3,238,294
Patented Mar. 1, 1966

3,238,294
ELECTRO-OPTICAL SCANNING SYSTEM
Donald M. Krauss, Somerset, N.J., assignor to Gulton Industries, Inc., Metuchen, N.J., a corporation of New Jersey
Filed Sept. 20, 1961, Ser. No. 139,519
2 Claims. (Cl. 178—7.1)

This invention is directed to electro-optical scanning systems and more particularly to improvements over the electro-optical scanning systems disclosed in H. J. Round Patent No. Re. 21,105, reissued May 30, 1939, and in patent application Ser. No. 53,770 of R. G. Day, filed September 2, 1960, now Patent No. 3,036,153, issued May 22, 1962.

The aforementioned electro-optical scanning systems, as well as the eletcro-optical scanning system of this invention, utilize a fiber optical bundle including a plurality of optically isolated light transmitting fibers terminating at one end in an image plane and at the other end in a scanning plane, the fiber ends in the scanning plane being arranged in a circle, means for applying a light image to the fiber ends in the image plane for transmission by the fibers to the scanning plane, and scanning means including photoelectric pickup means for progressively scanning the circularly arranged fiber ends in the scanning plane for creating electric signals in accordance with the light intensities at said fiber ends.

In one form of the electro-optical scanning system of H. J. Round, a single photoelectric cell carried by a rotating member progressively sweeps the circularly arranged fiber ends in the scanning plane so as to produce the electrical signals in accordance with the light intensities at said fiber ends. Such an arrangement involves relatively great rotating masses and requires slip-rings or the like for transmitting the electrical signals from the photoelectric cell with consequent introduction of noise into the signals. In the other form of the H. J. Round electro-optical scanning system, a photoelectric cell is provided for each fiber end in the scanning plane for charging associated condensers in accordance with the light intensities at said fiber ends, the condensers being successively discharged through a commutator for producing the electrical signals. Here, also noise is introduced into the signals by the commutator. In both forms of the H. J. Round system, the photocells must be so small as to make them impractical if a reasonable number of optical fibers are utilized for reasonable picture resolution, and large spacing between the optical fibers would be required to prevent overlapping of the light from adjacent optical fibers which in turn would require a device of relatively large dimensions.

The electro-optical scanning system of R. G. Day includes a single stationary photoelectric cell, a single large stationary lens for condensing light from the circularly arranged fiber ends in the scanning plane onto the photoelectric cell, and a rotating radial slit scanner between the scanning plane and the stationary lens progressively sweeping the circularly arranged fiber ends in the scanning plane for pulsing the photoelectric cell in accordance with the light intensities at said fiber ends. Thus, the R. G. Day system constitutes a substantial improvement over the aforementioned H. J. Round system, it having no moving photoelectric cells, slip-rings or commutators which create relatively large moving masses and noise in the signals, and it permitting the use of a relatively large number of closely spaced optical fibers in a device of relatively small dimensions for reasonable picture resolution.

In a practical fiber optical system, light emerges from the output end of each individual optical fiber in a diverging cone, the included angle being determined by the maximum angle of inclination of trapped light rays at the input end of the optical fiber. If all of the available light flux is to be used, the following conditions must be met: the width of the revolving slit, if one is used, must be at least as great as the diameter of the light cone at the plane of the slit; the condensing lens, if one is used, must be large enough in diameter to completely encompass the circular projection of all emerging light cones of all optical fibers at its entrance pupil; and the photosensitive area of the photoelectric pickup unit must be at least as large as the area illuminated by the divergent light cone in the plane of the photo-sensitive area and must completely contain that illuminated area. In a practical embodiment of a fiber optical system, the emerging light cone may have an included angle of up to 50°.

In the case of a radical slit scanner, such as in the aforementioned R. G. Day system, meeting the above conditions would require relatively small spacing between the optical fiber end and the plane of the slit, and between the photoelectric cell and the plane of the slit, these small spacings being quite critical and if not met, producing substantial waste of light. For a practical radial slit scanner, having reasonably dimensioned spacings, the light utilization is relatively small, running from 50% down to a fraction of one percent.

In view of the foregoing, the principal object of this invention is to provide an improved electro-optical scanning system wherein the light utilization will run well above 50% and will be limited only by the small transmission loss of a single small simple lens, wherein a stationary photoelectric pickup unit is utilized to eliminate large rotating masses and generation of noise, wherein the physical spacings between the optical fiber ends in the scanning plane, the scanner and the photoelectric pickup unit are commercially practical and relatively non-critical, and wherein large numbers of closely spaced optical fibers may be utilized for bright and clear picture resolution.

Briefly, this invention is directed to an improvement in an electro-optical scanning system having a fiber optical bundle including a plurality of optically isolated light transmitting fibers terminating at one end in an image plane and at the other end in a scanning plane wherein the fiber ends in the scanning plane are arranged in a circle about a central axis, and means for applying a light image to the fiber ends in the image plane for transmission by the fibers to the scanning plane.

The improvement of this invention includes a stationary photoelectric pickup unit facing the scanning plane and located on the central axis thereof. Preferably, the fiber ends in the scanning plane are normal to and face the photoelectric pickup unit at said central axis. A rotating member is located adjacent to the scanning plane and is rotatable about said central axis for normally masking light at the fiber ends in the scanning plane from the photoelectric pickup unit. A small lens is eccentrically carried by the rotating member to be revolved about said central axis and it progressively sweeps the circularly arranged fiber ends in the scanning plane. The small lens faces towards the photoelectric unit at said central axis and successively directs the light at said fiber ends in the scanning plane onto the photoelectric pickup unit for pulsing the photoelectric pickup unit in accordance with the light intensities at said fiber ends.

Preferably, an apertured mask is arranged adjacent the photoelectric pickup unit, it having an aperture therein at said central axis on which the light at the fiber ends is focused for admitting light to the photoelectric pickup unit only through the aperture therein. This apertured mask may be stationary and, in this event, the aperture therein is substantially circular and the light must be accurately focused and directed by the lens, in all positions thereof, centrally through the aperture. Alternatively, the apertured mask may be rotated about said central axis in synchronism with the rotation of the rotating lens carrying member. In this event, the aperture therein is an elongated aperture and it is positioned substantially normal to the path of focused light across the apertured mask. By utilizing this arrangement, the lens need not so accurately direct the focused light onto the photoelectric pickup unit, more tolerance being here permitted than where the apertured mask is stationary.

Further objects of this invention reside in the details of construction of the electro-optical scanning system and in the cooperative relationships between the component parts thereof.

Other objects and advantages of this invention will become apparent to those skilled in the art upon reference to the accompanying specification, claims and drawings in which:

FIG. 1 is an illustration of an electro-optical scanning system incorporating the instant invention.

FIG. 2 is a diagrammatic perspective view of one form of the electro-optical scanning system which may be utilized in FIG. 1 for reproduction of planar images.

FIG. 5 is a diagrammatic perspective view illustrating the manner of operation of another form of this invention.

FIG. 6 is an illustration partly in section showing the construction of the electro-optical scanning system whose operation is illustrated in FIG. 5.

Figure 3:
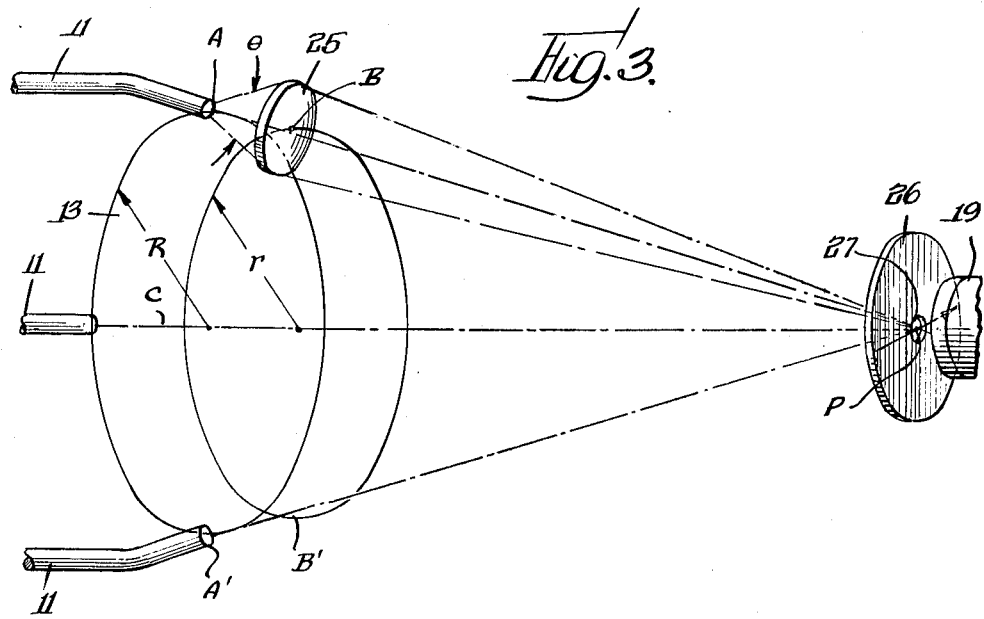
FIG. 3 is a diagrammatic perspective view illustrating the manner of operation of said one form of this invention.

Referring first to FIGS. 1 and 2, the electro-optical scanning system of this invention comprises a fiber optical bundle 10 which includes a plurality of optically isolated light transmitting fibers 11 which terminate at one end in an image plane 12 and at the other end in a scanning plane 13. The optically isolated light transmitting fibers 11 may be formed of glass fiber of suitable diameter, such as a few thousandths of an inch, each being optically isolated from its neighbor. When light is applied to the image end 12 of the light transmitting fibers 11, the light is transmitted by the fibers to the scanning plane 13. As shown more clearly in FIG. 2, the fiber ends in the image plane 12 are arranged in an area pattern, as for example, three rows a, b, c of four ends 1, 2, 3, 4 in each row. Of course, any number of rows of fiber ends and any number of fiber ends in each row may be utilized to build up the desired area pattern in the image plane. The other ends of the fibers 11 in the scanning plane 13 are arranged in a circle and, as illustrated in FIG. 2, the fiber ends in the scanning plane are sequentially arranged with respect to the fiber ends in the image plane 12, as indicated by the designations a1 through c4.

An objective lens 15 is arranged adjacent the image plane 12 of the fiber optical bundle 10 for projecting a light image of an object 16 onto the fiber ends in the image plane 12 for transmission by the fibers 11 to the circularly arranged fiber ends in the scanning plane 13. A photoelectric pickup unit, such as a photoelectric cell 19, is arranged on the central axis C of the circularly arranged fiber ends in the scanning plane 13 and faces towards such fiber ends. As shown more clearly in FIGS. 3 and 4, the fiber ends in the scanning plane face directly towards a point P adjacent to the photoelectric cell 19 by bending the optical fibers inwardly as shown, the fiber ends being directed along the circumference of a cone having its apex at point P. Alternatively, the emerging light may be directed toward point P by beveling the output ends of the fibers in such a manner as to produce refractive bending in the desired direction.

The light emerging from the fiber ends in the scanning plane 13 is normally masked from the photoelectric cell 19 by a rotating member 20, which is arranged adjacent the scanning plane 13 and which is rotated about the central axis C by a shaft 21 driven by an electric motor 22. The rotating member 20 eccentrically carries a small lens 25 which is revolved about the central axis C of the rotating member 20. At the instant pictured in FIG. 3, the revolving lens 25 has its optical center at B and its imaging fiber end A at point P adjacent to the photosensitive surface of the photoelectric cell 19. If the lens 25 now revolves clockwise around a circle of radious r to point B', fiber end A' in the scanning plane 13 is imaged at point P. As the lens 25 revolves about the axis C, all fiber ends in the image plane 13 between A and A' are imaged in turn at point P, i.e., a train of fiber end images moves past point P.

The light emerging from the fiber end in the scanning plane 13 emerges in a diverging cone which may have a total included angle $\theta$ of up to about 50°. Collection of all of the emergent light rays is made possible by directing the light cone along the line ABP and this is accomplished, as explained above, by bending the fiber ends around the circle slightly inwardly toward the center line C at point P or by beveling the ends of the fibers to produce refractive bending. The radius r of the arc of rotation of the optical center B of the lens 25 is made smaller than the radius R of the circularly arranged fiber ends in the scanning plane 13 by an amount sufficient to incline the optical axis of the lens 25 towards the point P and the lens 25 is mounted normal to this optical axis ABP.

As a specific example of the instant invention, the emergent light cone has an included angle $\theta$ of 50°, which is about as large as it would ever be, and the distance ABP is about 10 inches, which provides non-critical and convenient dimensions AB and BP. By utilizing a lens of ½ inch focal length, the dimension AB is .525 inch, the dimension BP is 9.475 inches and the magnification of the fiber end A is 18 to 1. The speed of the lens 25 is $f/1.07$ for collecting all of the rays emanating from the fiber end. The lens is relatively tiny, 8 mm. format or less, and the imaging quality of the lens is not at all critical, a small and inexpensive lens being quite practical.

To insure that only the light from one fiber end reaches the photosensitive surface of the photoelectric cell 19 at a time, the photosensitive surface is masked by an apertured mask 26 having an aperture 27 at the central axis C. The images of the successive fiber ends in the scanning plane 13 projected by the lens 25 are spaced apart by a distance equivalent to the fiber-to-fiber spacing times the magnification involved. The aperture 27 in the arrangement of FIG. 3 is made substantially circular and concentric with the central axis C and the aperture 27 is of sufficient diameter to allow all of the light focused therein at point P to pass therethrough onto the photosensitive surface.

Figure 4:
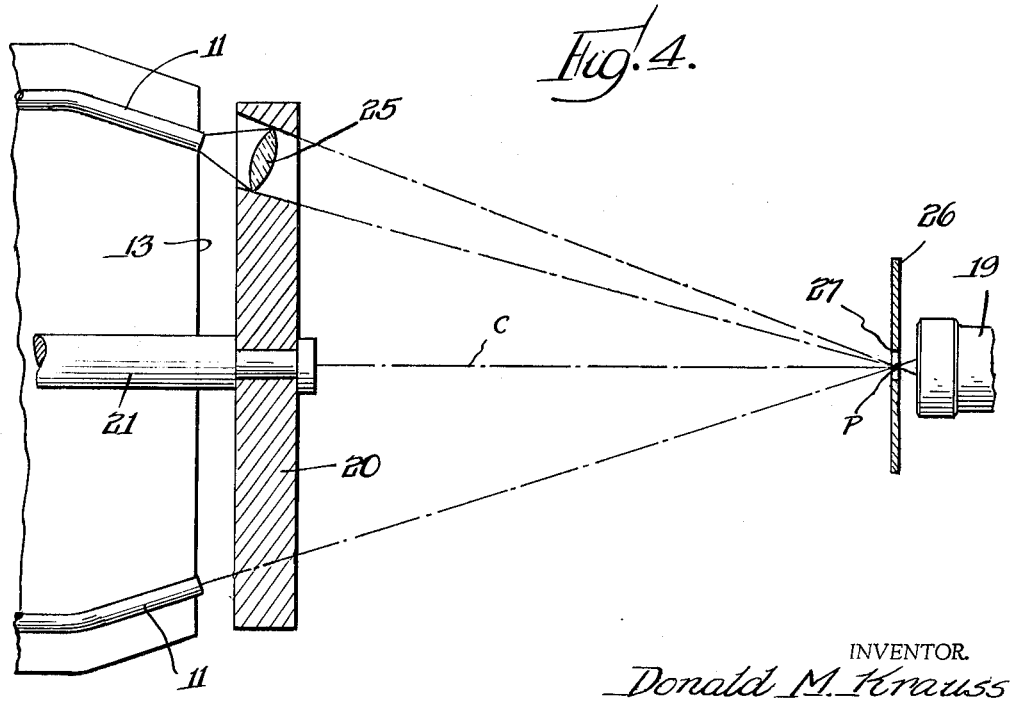
FIG. 4 is an illustration partly in section showing the construction of the electro-optical scanning system whose operation is illustrated in FIG. 3.

Assuming the lens 25 in the 12 o'clock position illustrated in FIG. 3, the image of of the associated fiber end will pass across the aperture 27 in a substantially horizontal direction from left to right as illustrated by the arrow in FIG. 3. When the lens 25 is revolved in a clockwise direction to the 6 o'clock position, for example at point P', the image of projected light will pass across the aperture from right to left in a substantially horizontal direction. When the lens 25 is at the 3 o'clock position, the projected light will pass the aperture 27 downwardly substantially vertically and, likewise, when the lens 25 is in the 9 o'clock position, the projected light will pass vertically upwardly past the aperture 27. Therefore, for each position of the lens 25, the light image projected thereby will pass the aperture 27 in the mask 26 in a corresponding direction. By making the mask aperture 27 substantially circular and concentrically arranged with the central axis C, the full image of each fiber end, as the lens 25 is revolved about the central axis, will be successively and independently focused on the mask aperture 27, and passed to the surface of the photoelectric cell 19. Thus, the photoelectric cell 19, is pulsed in discrete pulses by each circularly arranged optical fiber end in the scanning plane 13, and the amplitude of each such pulse corresponds directly to the light intensity at each fiber end. Thus, according to this arrangement of this invention, there is maximum light utilization and there are provided discrete electrical pulses of maximum amplitude corresponding to the intensity of the light at the fiber ends. The light saving realized by this invention permits the use of fiber optical scanning systems in many applications without any auxiliary lighting and clearly extends the market for such systems.

By reason of the arrangement of this invention, each circularly arranged fiber end in the scanning plane 13 is independently scanned and analyzed during each revolution of the rotating member 20, thereby providing a complete "frame" of information in a period well above a tolerable flicker rate for human vision while using very practical rotation speeds. For example, a 1,800 r.p.m. motor provides a 1/30 second "frame" rate.

As described above in connection with FIG. 2, there is a systematic relationship between the fiber ends in the image plane 12 and the circularly arranged fiber ends in the scanning plane 13. Such an arrangement is particularly useful where an independent and regular analysis of each point in the image is sequentially desired. Also, through the use of low-pass filtering or by arranging the fiber ends in the scanning plane 13 to be mutually tangent one to the other, the continuous electrical time analog of the image may be obtained for use in systems where analog processing is desirable. The systematic relationship between fiber ends need not be maintained in all systems, however. Completely random arrangements of fibers can be useful in systems where the integrated result of all the image densities in the frame serves a useful function. In such applications, the output of the scanning system would feed appropriate sorting and counting logic.

Also, the fiber ends in the image plane 12 may be arranged in a single line and the object in the form of information such as writing, numbers, words, code marks or the like may be moved relative to the fiber ends in the image plane. In this way, a strip of typewritten or printed material or photographs or the like, may be line-scanned and transmitted to a remote point for faithful facsimile reproduction. The fiber optical configuration of FIG. 1 may also be used for checking the contour of a manufactured part for quality control and the like. Here the fiber ends in the image plane would be arranged in a plurality of rows corresponding to the desired accurate contour of the object to be checked. Depending on the contour of the object to be checked, light would be applied to certain of the fiber ends and be cut off from the other fiber ends. Any deviation of the contour of the object to be checked from the desired contour would immediately be determined by the electro-optical scanning system. This could be done with a digital computer or the like where the digital computer is pulsed by the photoelectric pickup unit 19. Other arrangements of the fiber ends in the image plane may be utilized within the purview of this invention for other purposes; as for example, linear measurement, area measurement, character recognition, pattern recognition, particle counting, and the like.

A possible system embodiment of this invention is shown in FIG. 1. Here the photoelectric cell 19 is shown controlling a suitable transmitter 30 for sending the analog or pulse video signal to appropriate processing circuits for accomplishing any of the forementioned results. For those applications where synchronizing information must be transmitted, such information may be taken from the rotating shaft 21 or the rotating member 20 by electro-mechanical, electro-optical or electromagnetic means well known in the art. The synchronizing information so obtained may be transmitted separately or applied to the transmitter 30 to be mixed with the video information.

The arrangement thus far described, as shown in FIGS. 1 to 4, utilizes a stationary apertured mask 26 adjacent the photoelectric cell 19 wherein the central substantially circular aperture 27 thereof causes pulsing of the photoelectric cell 19 as the rotary member 20 is rotated. That arrangement requires accurate positioning and alignment of the optical fiber ends 11, the small lens 25, the aperture 27 in the apertured mask 26 and the photoelectric cell 19 so that the full amount of light emanating from each optical fiber 11 is projected on the photosensitive surface of the photoelectric cell 19. If any appreciable misalignment should be present, the full amount of light may not be projected upon the photoelectric cell and, hence, errors in the reproduction of the image may occur.

In order to eliminate that possibility and to provide for greater tolerances in the make up of the scanning system, a modified arrangement, such as illustrated in FIGS. 5 and 6 may be utilized. The arrangement of FIGS. 5 and 6 corresponds to that of FIGS. 1 to 4, with one principal exception, and like reference characters have been utilized for like parts in both arrangements. What has been said above in connection with the form of the invention illustrated in FIGS. 1 to 4 applies equally to the form of the invention illustrated in FIGS. 5 and 6. The form of the invention illustrated in FIGS. 5 and 6 differs from that illustrated in FIGS. 1 to 4 by using a different apertured mask 45 which is rotated and which is provided with an elongated aperture 46. The apertured mask 45 is rotated in synchronism with the rotating member 20 and this may be accomplished by connecting the apertured mask 45 through a suitable housing 47 to the rotating member 20. The elongated aperture 46 in the apertured mask 45 is substantially normal to the path of the focused light across the apertured mask 45. In other words, the elongated opening 46 is oriented parallel to a line extending from the center of the lens 25 to the center of revolution thereof. Since the apertured mask 45 rotates in synchronism with the rotating member 20, the fiber end images will always cross the elongated aperture 46 at right angles thereto. If the elongated opening 46 is made substantially one fiber image diameter wide, it can be made long enough so that considerable error in the placement of each fiber image can be tolerated without any appreciable adverse effect upon the output of the photoelectric cell 19. As a result, the arrangement of FIGS. 4 and 5 will give the same results as the arrangement of FIGS. 1 to 4 without the necessity for such close tolerances as would be required in the arrangement of FIGS. 1 to 4.

While for purposes of illustration two forms of this invention have been disclosed, other forms thereof may become apparent to those skilled in the art upon reference to this disclosure, and, therefore, this invention is to be limited only by the scope of the appended claims.

I claim as my invention:

1. In an electro-optical scanning system having a fiber optical bundle including a plurality of optically isolated light transmitting fibers terminating at one end in an image plane and at the other end in a scanning plane, the fiber ends in the scanning plane being arranged in a circle, and means for applying a light image to the fiber ends in the image plane for transmission by the fibers to the scanning plane, the improvement comprising, a stationary photoelectric pickup unit facing the scanning plane, an apertured mask adjacent the photoelectric pickup unit having an elongated aperture therein for admitting light to the photoelectric pickup unit only through the elongated aperture therein, a rotating member adjacent the scanning plane and rotatable concentrically with the fiber ends in the scanning plane for normally masking light at the fiber ends in the scanning plane from the photoelectric pickup unit, a lens eccentrically carried by the rotating member adjacent to and progressively sweeping the fiber ends in the scanning plane and successively directing the light at the fiber ends across the apertured mask and through the elongated aperture therein onto the photoelectric unit for pulsing the photoelectric unit in accordance with the light intensities at said fiber ends, and means for rotating the apertured mask in synchronism with the rotating member, the elongated aperture in the apertured mask being substantially normal to the path of the directed light across the apertured mask.

2. In an electro-optical scanning system having a fiber optical bundle including a plurality of optically isolated light transmitting fibers terminating at one end in an image plane and at the other end in a scanning plane, the fiber ends in the scanning plane being arranged in a circle about a central axis, and means for applying a light image to the fiber ends in the image plane for transmission by the fibers to the scanning plane, the improvement comprising, a stationary photoelectric pickup unit facing the scanning plane and located on said central axis thereof, the fiber ends in the scanning plane being normal to and facing the photoelectric pickup unit at said central axis, an apertured mask adjacent the photoelectric pickup unit having an elongated aperture therein at said central axis for admitting light to the photoelectric pickup unit only through the elongated aperture therein, a rotating member adjacent the scanning plane and rotatable about said central axis for normally masking light at the fiber ends in the scanning plane from the photoelectric pickup unit, a lens eccentrically carried by the rotating member adjacent to the fiber ends in the scanning plane and revolved about said central axis and progressively sweeping the circularly arranged fiber ends in the scanning plane, said lens facing towards the photoelectric unit at said central axis and successively directing the light at said fiber ends in the scanning plane across the apertured mask and through the elongated aperture therein onto the photoelectric pickup unit at said central axis for pulsing the photoelectric unit in accordance with the light intensities at said fiber ends, and means for rotating the apertured mask in synchronism with the rotating member, the elongated aperture in the apertured mask being substantially normal to the path of the directed light across the apertured mask.

References Cited by the Examiner

UNITED STATES PATENTS

| Re. 21,105 | 5/1939 | Round | 178—7.11 |
| 2,107,759 | 2/1938 | Mattke | 178—7.6 |
| 2,840,632 | 6/1958 | Parker | 178—7.6 |
| 3,036,153 | 5/1962 | Day | 178—7.6 |

FOREIGN PATENTS 654,759  6/1951  Great Britain.

DAVID G. REDINBAUGH, *Primary Examiner.*

JOHN P. WILDMAN, *Examiner.*